US012692397B2

(12) United States Patent
Witzman et al.

(10) Patent No.:  US 12,692,397 B2
(45) Date of Patent:  Jul. 28, 2026

(54) COMPOSITION INCLUDING DUAL CAVITY COLOR SHIFTING PIGMENTS

(71) Applicant: VIAVI SOLUTIONS INC., San Jose, CA (US)

(72) Inventors: Matthew Ryan Witzman, Windsor, CA (US); Bryan James Clifton, Santa Rosa, CA (US); Cornelis Jan Delst, Fairfax, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 16/596,373

(22) Filed: Oct. 8, 2019

(65) Prior Publication Data

US 2021/0102072 A1     Apr. 8, 2021

(51) Int. Cl.
*C09C 1/00*          (2006.01)
*G02B 5/28*          (2006.01)

(52) U.S. Cl.
CPC ............ *C09C 1/0033* (2013.01); *C09C 1/006* (2013.01); *G02B 5/28* (2013.01); *C01P 2004/61* (2013.01); *C01P 2006/42* (2013.01); *C01P 2006/60* (2013.01); *C01P 2006/62* (2013.01); *C01P 2006/63* (2013.01); *C01P 2006/64* (2013.01); *C09C 2200/1054* (2013.01); *C09C 2200/24* (2013.01); *C09C 2200/301* (2013.01); *C09C 2200/302* (2013.01); *C09C 2200/303* (2013.01); *C09C 2200/304* (2013.01); *C09C 2200/305* (2013.01); *C09C 2200/306* (2013.01); *C09C 2200/307* (2013.01); *C09C 2200/308* (2013.01); *C09C 2210/20* (2013.01)

(58) Field of Classification Search
CPC .......... C09C 1/0033; C09C 2200/1054; C09C 2200/24; C09C 2210/20; C09C 2200/301; C09C 2200/302; C09C 2200/303; C09C 2200/304; C09C 2200/305; C09C 2200/306; C09C 2200/307; C09C 2200/308; C09C 1/006; C09C 1/00; C09C 1/04; C09C 1/28; C09C 1/40; C09C 1/62; C09C 1/64; C09C 1/0015; C09C 3/00; C09C 3/06; C09C 2200/00; C09C 2220/00; C09C 2210/00; G02B 5/28; H01F 1/10; H01F 1/14; H01F 1/04; C01P 2006/42; C01P 2006/60; C01P 2004/61; C01P 2006/62; C01P 2006/63; C01P 2006/64; B42D 25/30; B42D 25/45; G03H 1/02
See application file for complete search history.

(56) References Cited

U.S. PATENT DOCUMENTS

| | | | |
|---|---|---|---|
| 5,766,738 A | 6/1998 | Phillips et al. | |
| 6,157,486 A | 12/2000 | Benson, Jr. et al. | |
| 6,472,455 B1* | 10/2002 | Bleikolm .............. | C09C 1/0081 523/160 |
| 6,686,042 B1* | 2/2004 | LeGallee .............. | C09C 1/0015 428/404 |
| 9,796,856 B2 | 10/2017 | Delst et al. | |
| 10,189,997 B2 | 1/2019 | Delst et al. | |
| 11,007,808 B2 | 5/2021 | Kohlmann et al. | |
| 12,187,901 B2 | 1/2025 | Delst et al. | |
| 12,365,802 B2 | 7/2025 | Delst et al. | |
| 2004/0028905 A1 | 2/2004 | Phillips et al. | |
| 2006/0228553 A1* | 10/2006 | Argoitia ................. | C09D 11/50 428/407 |
| 2007/0098989 A1* | 5/2007 | Raksha ................. | C09C 1/0024 428/692.1 |
| 2011/0121556 A1* | 5/2011 | Raksha ................. | C09C 1/0081 106/400 |
| 2014/0090579 A1 | 4/2014 | Delst et al. | |
| 2015/0138641 A1 | 5/2015 | Delst et al. | |
| 2015/0258837 A1* | 9/2015 | Ritter ...................... | G09F 19/14 283/67 |
| 2017/0369709 A1* | 12/2017 | Seydel .................. | C09C 1/0015 |
| 2019/0153233 A1* | 5/2019 | Delst ...................... | C09D 11/50 |
| 2019/0225006 A1* | 7/2019 | Kohlmann .............. | C09C 1/003 |
| 2019/0314857 A1 | 10/2019 | Nikseresht Ghanepour et al. | |
| 2019/0322871 A1 | 10/2019 | Suzuki et al. | |
| 2021/0102072 A1 | 4/2021 | Witzman et al. | |
| 2021/0371681 A1 | 12/2021 | Omura et al. | |

FOREIGN PATENT DOCUMENTS

| | | |
|---|---|---|
| CN | 1287568 A | 3/2001 |
| CN | 1313953 A | 9/2001 |
| CN | 1471562 A | 1/2004 |
| CN | 1854203 A | 11/2006 |
| CN | 1903950 A | 1/2007 |
| CN | 101267798 A | 9/2008 |
| CN | 102079894 A | 6/2011 |
| CN | 102317379 A | 1/2012 |
| CN | 104684979 A | 6/2015 |
| CN | 104736346 A | 6/2015 |
| CN | 105824066 A | 8/2016 |
| CN | 107086222 A | 8/2017 |
| CN | 107544106 A | 1/2018 |
| CN | 108752977 A | 11/2018 |
| CN | 110068553 A | 7/2019 |
| DE | 102016110192 A1 | 1/2017 |
| EP | 1325086 B1 | 2/2012 |
| EP | 2531562 A2 | 12/2012 |
| EP | 2873994 A1 | 5/2015 |
| JP | 2006231608 A | 9/2006 |
| JP | 2006293351 A | 10/2006 |
| KR | 100441995 B1 | 9/2004 |

(Continued)

OTHER PUBLICATIONS

Intellectual Property India, "Examination report for India Patent Application No. 202418002063", dated Apr. 23, 2026, 7 pages.

*Primary Examiner* — Anthony J Green
*Assistant Examiner* — Marites A Guino-O Uzzle
(74) *Attorney, Agent, or Firm* — Mannava & Kang, P.C.

(57)          ABSTRACT

A composition including a dual cavity color shirting pigment and a single cavity color shifting pigment is disclosed. A method of making the composition is also disclosed.

13 Claims, 9 Drawing Sheets

(56)        References Cited

FOREIGN PATENT DOCUMENTS

| | | | |
|---|---|---|---|
| RU | 2598279 | C1 | 9/2016 |
| WO | 02/31058 | A1 | 4/2002 |
| WO | 03053674 | A1 | 7/2003 |
| WO | 2016005158 | A1 | 1/2016 |
| WO | 2019103937 | A1 | 5/2019 |
| WO | 2019131957 | A1 | 7/2019 |
| WO | 2021071853 | A1 | 4/2021 |

* cited by examiner

Process Path Color Trajectories CIE L*a*B* Color Space

···■·· Dual Cavity

Process Path Color Trajectories CIE L*a*B* Color Space

—— Single Cavity
····· Dual Cavity

COMPOSITION INCLUDING DUAL CAVITY COLOR SHIFTING PIGMENTS

FIELD OF THE INVENTION

The present disclosure generally relates to a composition including dual cavity color shifting pigments and single cavity color shifting pigments. Methods of making and using the composition are also disclosed.

BACKGROUND OF THE INVENTION

Interference pigments commonly include a reflector layer, a dielectric layer, and an absorber layer. The dielectric layer forms a cavity for light that filters out specific wavelengths by destructive interference. In some cases, it is beneficial to add a second cavity on top of the first one, resulting in a dual cavity. This is done by adding a dielectric layer and an absorber layer. However, production of dual cavity pigments is not simple and the dual cavity pigments are relatively thick, heavy, and expensive. In particular, controlling the exact color (hue, lightness, chroma) in a roll coating relies on an extreme level of layer control that needs to be done in a closed loop.

One way to achieve a target color is by intentionally coating to slightly different specifications and blending with sub-lots. The blending negatively impacts the color performance. Moreover, blending with dual cavity pigments is not simple because many variables impact color performance in different ways. So, it would be simpler to formulate a composition based on best color performance (provided by a dual cavity pigment) and either accept the color difference or adjust the color difference by other means.

Another way to achieve the target color would be to use a dual cavity pigment but make the inner absorber layer thinner, which would permit some additional energy in the blue wavelength, i.e., this moves the process path to lower hue angles. However, it has been found that a thin inner absorber layer can lead to significant problems with color stability. In particular, this leads to significant color shifts with a slight oxidation of the inner absorber layer thereby causing dramatic changes to resultant color, which is highly undesirable.

Single cavity color shifting pigments can be made easier than dual cavity pigment, for example, it is easier to make them with specific hue angles, lightness, and chroma. For this reason, there is smaller batch-to-batch color difference. However, single cavity color shifting pigments have a lower color performance.

What is needed is a composition that can provide at least some of the following properties: cost effective, high chroma, and high color stability.

SUMMARY OF THE INVENTION

In an aspect, there is disclosed a composition comprising a dual cavity color shirting pigment; and a single cavity color shifting pigment.

In another aspect, there is disclosed a method of forming a composition, comprising blending a dual cavity color shifting pigment and a single cavity color shifting pigment.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

Figure 1:
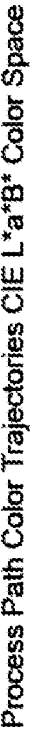
FIG. 1 is an L*a*b* graph illustrating the process path of a single cavity color shifting pigment in three-dimension (3D)
Figure 1:
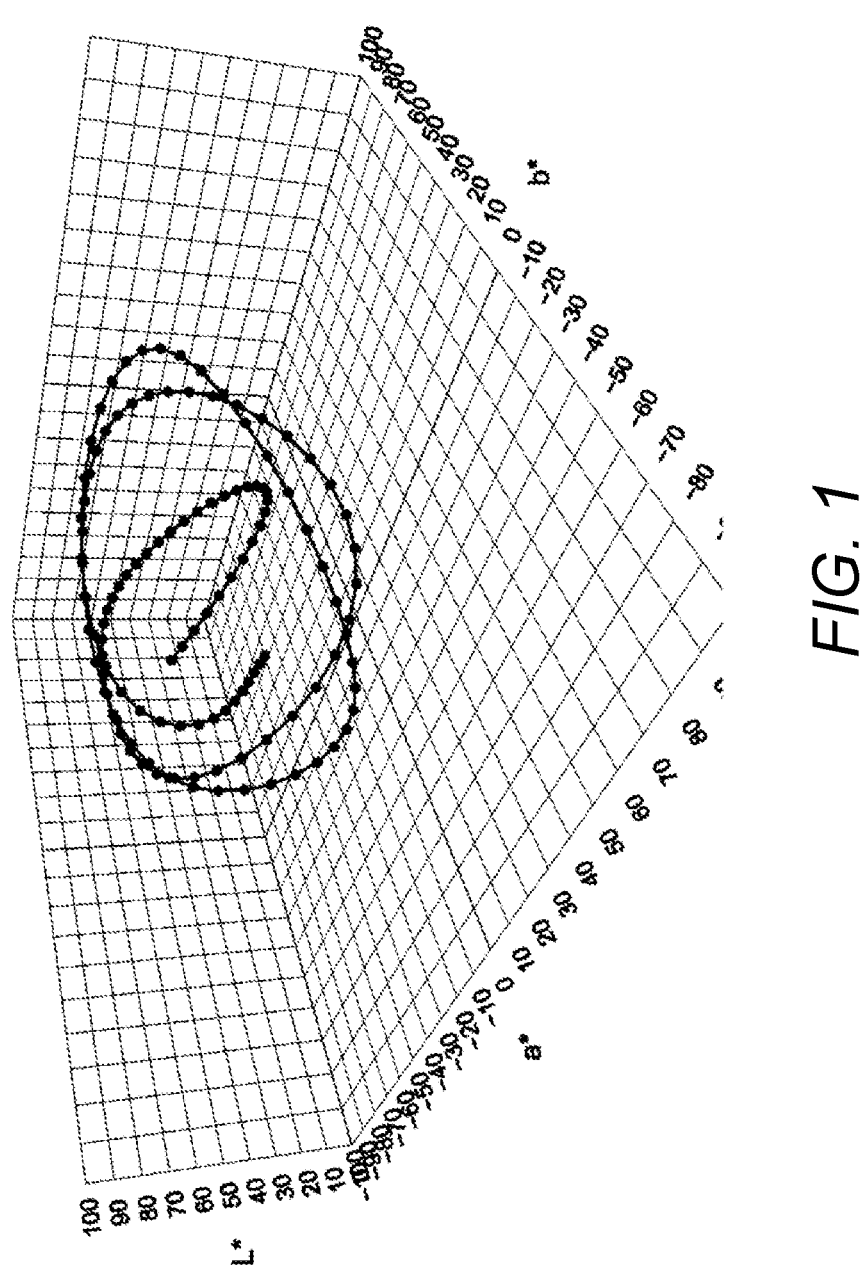

It is to be understood that both the foregoing general description and the following detailed description are exemplary and explanatory only, and are intended to provide an explanation of various embodiments of the present teachings.

In its broad and varied embodiments, disclosed herein is a composition including a dual cavity color shifting pigment; and a single cavity color shifting pigment.

A "single cavity" is understood to mean a core, and a dielectric layer, and optionally an absorber layer on a single side of an article, such as a pigment or flake. For example, a single cavity can include a core with a dielectric layer on each side of the core. A "core" is understood to mean a layer chosen from a reflector layer, a magnetic layer, and combinations of reflector layers and magnetic layers, such as the following structure: reflector layer/magnetic layer/reflector layer. A "dual cavity" is understood to mean a core, a first dielectric layer, an absorber layer, a second dielectric, and optionally a second absorber layer on a single side of an article, such as a pigment or flake. For example, the dual cavity can include the following structure, and variations thereof: dielectric/absorber/dielectric/core/dielectric.

The composition can allow for improved color performance that cannot be achieved by use of either the dual cavity color shifting pigment or the single cavity color shifting pigment alone. In particular, the dual cavity color shifting pigment and the single cavity color shifting pigment exhibit color shift at angle, although the color shift is not identical. Although a non-optically variable pigment or other colorant could be used with either a single cavity color shifting pigment or a dual cavity color shifting pigment in an attempt to improve color performance, the non-optically variable pigment or other colorant would not exhibit a color shift, and is not within the present scope.

The composition can result in a face color that is not achievable with a single cavity color shifting pigment alone. The composition can result in a face color that is not achievable with a dual cavity color shifting pigment alone. The composition can therefore exhibit new colors not previously available.

The composition can exhibit improved color stability as compared to a composition of a dual cavity color shifting pigment with a thinner inner absorber layer.

The composition can include a dual cavity color shifting pigment. In an aspect, the composition can include a major amount of a dual cavity color shifting pigment in order to provide improved color performance and/or color stability. A major amount is understood herein to be greater than or equal to about 50% by weight based upon the total weight of the composition. In an aspect, the composition can include a dual cavity color shifting pigment in an amount from about 50% to about 99%, for example, from about 55% to about 90%, and as a further example, from about 60% to about 85%, by weight based upon the total weight of the composition.

In other aspects, the composition can include a dual cavity color shifting pigment in any amount suitable to produce a new face color. The composition can include a dual cavity color shifting pigment in an amount from about 20%, for example, from about 40%, for example from about 60%, and as a further example from about 80%, by weight based upon the total weight of the composition. The composition can include any amount of dual cavity coloring shifting pigment including any amounts between 0% and 100% by weight based upon the total weight of the composition.

The composition can include a single cavity color shifting pigment. In an aspect, the composition can include a minor amount of a single cavity color shifting pigment in order to tune a color and/or improve color stability. A minor amount is understood herein to be less than about 50% by weight based upon the total weight of the composition. In an aspect, the composition can include a single cavity color shifting pigment in an amount from about 1% to about 49%, for example, from about 5% to about 45%, and as a further example, from about 10% to about 40%, by weight based upon the total weight of the composition.

In other aspects, the composition can include a single cavity color shifting pigment in any amount suitable to produce a new face color. The composition can include a single cavity color shifting pigment in an amount from about 20%, for example, from about 40%, for example from about 60%, and as a further example from about 80%, by weight based upon the total weight of the composition. The composition can include any amount of single cavity coloring shifting pigment including any amounts between 0% and 100% by weight based upon the total weight of the composition.

The single cavity color shifting pigment can be used in the composition to control for lightness, hue, and chroma. A single cavity color shifting pigment can impact a color at angle of the composition. A single cavity color shifting pigment can include a core, a dielectric layer, and optionally an absorber layer. Each layer of the single cavity color shifting pigment will be discussed in more detail below.

The dual cavity color shifting pigment can include a core, a first dielectric layer, an absorber layer, a second dielectric, and optionally a second absorber layer. The alternating dielectric layers and absorber layers can include any number of each layer to form a stack. The stack of alternating dielectric layers and absorber layers can be present on one side of the core or on both sides of the core.

The first dielectric layer can include a physical thickness that is the same or different from the second dielectric layer. The thickness of the second dielectric layer can be chosen to match at least one of the reflection peaks of the first dielectric layer. The physical thickness of the dielectric layer can be amount ranging from about 5 nm to about 1000 nm, for example, from about 350 nm to about 800 nm, and as a further example from about 380 nm to about 500 nm, and as a further example, from about 590 nm to about 740 nm.

The layers in each of the single cavity color shifting pigment and the dual cavity color shifting pigment are disclosed below.

As discussed above, a core can include at least one layer chosen from a reflector layer, a magnetic layer, and combinations thereof. In an aspect, the core is a reflector layer. In another aspect, the core is a magnetic layer. In another aspect, the core is a magnetic reflector layer. In a further aspect, the core is a combination including a first reflector layer, a magnetic layer, and a second reflector layer. The materials for use in the core are discussed below.

The reflector layer can be a wideband reflector, e.g., spectral and Lambertian reflector (e.g., white $TiO_2$). The reflector layer can each independently include metals, non-metals, and/or metal blends or alloys. The terms "metallic" or "metallic layer" used herein, unless otherwise stated, are intended to include all metals, metal blends and alloys, pure metal or metal alloy containing materials, compound, compositions, and/or layers.

In one example, the materials for the reflector layer can include any materials that have reflective characteristics in the desired spectral range. For example, any material with a reflectance ranging from 50% to 100% in the desired spectral range. An example of a reflective material can be aluminum, which has good reflectance characteristics, is inexpensive, and easy to form into or deposit as a thin layer. Other materials can also be used in place of aluminum. For example, copper, silver, gold, platinum, palladium, nickel, cobalt, niobium, chromium, tin, and combinations, blends or alloys of these or other metals can be used as reflective materials. In an aspect, the material for the reflector layer can be a white or light colored metal. In other examples, the reflector layer can include, but is not limited to, the transition and lanthanide metals and combinations thereof; as well as metal carbides, metal oxides, metal nitrides, metal sulfides, a combination thereof, or mixtures of metals and one or more of these materials.

The thickness of the reflector layer can range from about 5 nm to about 5000 nm, although this range should not be taken as restrictive. For example, the lower thickness can be selected so that the reflector layer provides a maximum transmittance of 0.8. Additionally, or alternatively, for a reflector layer including aluminum the minimum optical density (OD) can be from about 0.1 to about 4 at a wavelength of about 550 nm.

The magnetic layer can include magnetic permeable, magnetic orientable materials, magnetic materials, and combinations thereof. A magnetic material, such as ferromagnetic and ferrimagnetic materials, includes but is not limited to, nickel, cobalt, iron, gadolinium, terbium, dysprosium, erbium, and their blends, alloys or oxides. Other examples of blends or alloys include, but are not limited to, Fe/Si, Fe/Ni, Fe/Co, Fe/Ni/Mo, Fe/Cr, Ni/Cr, and combinations thereof. In an aspect, the magnetic layer can include a polymer containing iron oxide particles. Hard magnets of the type $SmCo_5$, $NdCo_5$, $Sm_2Co_{17}$, $Nd_2Fe_{14}B$, $Sr_6Fe_2O_3$, $TbFe_2$, Al—Ni—Co, and combinations thereof, can also be used as well as spinel ferrites of the type $Fe_3O_4$, $NiFe_2O_4$, $MnFe_2O_4$, $CoFe_2O_4$, or garnets of the type YIG or GdIG, and combinations thereof. In an aspect, the magnetic material can be ferritic stainless steel. The magnetic material can be selected for its reflecting or absorbing properties as well as its magnetic properties. The magnetic layer can be formed by a material having magnetic and non-magnetic particles, or magnetic particles within non-magnetic medium, for example cobalt-doped zinc oxide film deposited on a substrate. The magnetic layer can either be a distinct layer or can either function as a reflector layer (magnetic reflector layer) or an absorber layer.

Although this broad range of magnetic materials can be used, "soft" magnets can be used in an aspect. As used herein, the term "soft magnets" refers to any material exhibiting ferromagnetic properties but having a remanence that is substantially zero after exposure to a magnetic force. Soft magnets can show a quick response to an applied magnetic field, but have very low (coercive fields (Hc)= 0.05–300 Oersted (Oe)) or zero magnetic signatures, or retain very low magnetic lines of force after the magnetic field is removed. Similarly, as used herein, the term "hard magnets" (also called permanent magnets) refers to any material that exhibits ferromagnetic properties and that has a long lasting remanence after exposure to a magnetizing force. A ferromagnetic material is any material that has permeability substantially greater than 1 and that exhibits magnetic hysteresis properties. In an aspect, any magnetic material can be used in the magnetic layer so long as the material enables the orienting of the pigment in a magnetic field.

The magnetic layer can have a thickness ranging from about 10 nm to about 100 nm, for example, from about 35 nm to about 45 nm, and as a further example, about 40 nm. The magnetic layer can be deposited to a thickness so that it is substantially opaque. In an aspect, the magnetic layer can be deposited to a thickness so that it is not substantially opaque.

Suitable materials for the dielectric layer include those having a "high" index of refraction, defined herein as greater than about 1.65, as well as those have a "low" index of refraction, which is defined herein as about 1.65 or less. The refractive index of a dielectric layer can be selected to provide a degree of color travel required wherein color travel can be defined as the change in hue angle measured in L*a*b* color space with the viewing angle. As an example, a gold color (around 90-degree hue angle) is achieved at an optical thickness of 140 nm (2 quarter wave), 280 nm (4 quarter wave) and 430 nm (6 quarter wave). Some colors are less attractive for the human eye due to low chromaticity or low lightness Examples of suitable high refractive index materials for a dielectric layer include zinc sulfide (ZnS), zinc oxide (ZnO), zirconium oxide ($ZrO_2$), titanium dioxide ($TiO_2$), carbon (C), indium oxide ($In_2O_3$), indium-tin-oxide (ITO), tantalum pentoxide ($Ta_2O_5$), ceric oxide ($CeO_2$), yttrium oxide ($Y_2O_3$), europium oxide ($Eu_2O_3$), iron oxides such as (II) diiron (III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), combinations thereof, and the like.

Suitable low refractive index materials for a dielectric layer include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

The dielectric layer can be deposited as a dielectric stack having a predetermined number of layers. In this example, the stack can include one or more layers of a low refractive index material and one or more layers of a high refractive index material. The layers having low refractive index material (low refractive index layers) and the layers having high refractive index material (high refractive index layers) can alternate. For example, a high refractive index layer can be deposited on the reflector layer. A low refractive index layer can then be deposited on the high refractive index layer. Alternating layers of high and low refractive index layers can be repeated as many times as necessary to create a dielectric layer as a dielectric stack. The alternating layers can be stacked in any sequence, for example, the layers can be stacked in a sequence of $(H/L)_n$, $(H/L)_nH$, or $L(H/L)_n$ wherein H denotes higher refractive index layer and L denotes a lower refractive index layer. The number of alternating low refractive index layers and the high refractive index layers (n) can range from about 2 to over about 75, such as from about 10 to about 50 alternating layers, or for example from about 5 to about 25 alternating layers. Any number of layers can be printed using any number of different materials. In this manner, the tailoring the optical design is possible by controlling the layer thickness and refractive index of each dielectric layer. In an aspect, the dielectric layer can be a transparent layer or can be a colored layer.

In an aspect, a disclosed pigment (single cavity color shifting or dual cavity color shifting) can use a high refractive index material as an external layer, avoiding the use of an outer absorber layer, such as a secondary absorber layer (dual cavity color shifting). The high refractive index material as an external layer can result in a partial reflection with a liquid medium, which is used to create a color shifting colorant, to create a dual cavity. In this aspect, the liquid medium can have a refractive index that is different from the high refractive index material to cause the partial reflection.

The absorber layer can be deposited on the dielectric layer. The absorber layer can independently include metals, non-metals, or metal blends or alloys. In one example, the materials for the absorber layer can include any absorber material, including both selective absorbing materials and nonselective absorbing materials. For example, the absorber layer can be formed of nonselective absorbing metallic materials deposited to a thickness at which the layer is at least partially absorbing, or semi-opaque. An example of a non-selective absorbing material can be a gray metal, such as chrome or nickel. An example of a selective absorbing material can be copper or gold. In an aspect, the absorbing material can be chromium. Non-limiting examples of suitable absorber materials include metallic absorbers such as chromium, aluminum, silver, nickel, palladium, platinum, titanium, vanadium, cobalt, iron, tin, tungsten, molybdenum, rhodium, niobium, copper, as well as other absorbers such as carbon, graphite, silicon, germanium, cermet, ferric oxide or other metal oxides, metals mixed in a dielectric matrix, and other substances that are capable of acting as a uniform or selective absorber in the visible spectrum. Various combinations, mixtures, compounds, or alloys of the above absorber materials that can be used to form the absorber layer.

Examples of suitable alloys of the above absorber materials can include Inconel (Ni—Cr—Fe), stainless steels, Hastalloys (Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. Other examples of suitable compounds for the absorber layer include, but are not limited to, titanium-based compounds such as titanium silicide (TiSi$_2$), titanium boride (TiB$_2$), and combinations thereof. Alternatively, the absorber layer can be composed of a titanium-based alloy deposited in a matrix of Ti, or can be composed of Ti deposited in a matrix of a titanium-based alloy or blend. For example, the absorber layer can include chromium.

The absorber layer can also be formed of a magnetic material, such as a cobalt nickel alloy or blend or an Iron Chrome alloy or blend. This can simplify the manufacture of a magnetic color shifting device or structure by reducing the number of materials required.

The absorber layer can be formed to have a physical thickness in the range from about 1 nm to about 50 nm, such as from about 5 nm to about 10 nm, depending upon the optical constants of the absorber layer material and the desired peak shift. The absorber layer can be composed of the same material or a different material if more than one absorber layer is present, such as in a dual cavity color shifting pigment, and can have the same or different physical thickness for each layer.

The composition can further include a liquid medium. The composition can be a color shifting colorant. The color shifting colorant can be, for example, an ink, coating or a paint. Non-limiting examples of a liquid medium can include solvents, for example acetates, such as ethyl acetate, propyl acetate, and butyl acetate; acetone; water; ketones, such as dimethyl ketone (DMK), methylethyl ketone (MEK), secbutyl methyl ketone (SBMK), ter-butyl methyl ketone (TBMK), cyclopenthanon, and anisole; glycol and glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; and mixtures thereof. In an aspect, the liquid medium can be present in an amount ranging from about 0% to about 99.9%, for example, from about 0.005% to about 99%, and as a further example from about 0.05% to about 90%, by weight relative to the total weight of the color shifting colorant.

Each of the disclosed color shifting pigments (single cavity and/or dual cavity) can be altered, such as mechanically altered, for example by breaking, to form flakes, foils, or sheets. The color shifting pigments can be formed into flakes, foils, or sheets ranging from about 2 microns to about 40 microns in dimension. The color shifting pigments can have a D50 (50% of pigments larger than 20 microns and 50% smaller) of 20 microns, with a D0.01 (99.9% of pigments larger than 4 microns) of 4 microns and a D99.99 (0.01% of pigments smaller than 80 microns) of 80 microns.

The single cavity color shifting pigments and dual cavity color shifting pigments can each be independently, in the form of flakes, foils, or sheets, according to various examples. One of ordinary skill in the art would appreciate that each of the disclosed color shifting pigments can include any number of layers in any order. The disclosed color shifting pigments (single cavity color shifting pigment and/or dual cavity color shifting pigment) can each be symmetric, i.e., have the same layers on each side of a central layer, such as the core. The color shifting pigments (single cavity color shifting pigment and/or dual cavity color shifting pigment) can each be asymmetric, i.e., have different layers on each side of a central layer, such as the core. Additionally, the materials in any particular layer can be the same or different from the materials in any other layer. It is also envisioned that the color shifting pigments disclosed herein can include additional layers, such as intermediate layers or intervening layers.

The composition disclosed herein can provide a balance between cost and color performance. Namely, the single cavity color shifting pigment can be made at a lower cost, but exhibits less color performance. Alternatively, the dual cavity color shifting pigment can be made at a higher cost, but exhibits high color performance. The disclosed composition including both color shifting pigments can be optimized to obtain the best features of each pigment depending upon the particular application. Additionally, the disclosed composition can achieve a face color that is not possible by either color shifting pigment alone.

A single cavity color shifting pigment can have a structure chosen from any of the following structures, wherein the layers are as defined above:

dielectric/core/dielectric;
absorber/dielectric/core/dielectric; or
absorber/dielectric/core/dielectric/absorber.

A dual cavity color shifting pigment can have a structure chosen from any of the following structures, wherein the layers are as defined above:

dielectric/absorber/dielectric/core/dielectric;
absorber/dielectric/absorber/dielectric/core/dielectric;
dielectric/absorber/dielectric/core/dielectric/absorber;
absorber/dielectric/absorber/dielectric/core/dielectric/absorber;
dielectric/absorber/dielectric/core/dielectric/absorber/dielectric;
absorber/dielectric/absorber/dielectric/core/dielectric/absorber/dielectric or
absorber/dielectric/absorber/dielectric/core/dielectric/absorber/dielectric/absorber.

There is also a disclosed a method for manufacturing a composition as described herein. The method can comprise blending a dual cavity color shifting pigment and a single cavity color shifting pigment. A skilled artisan can identify a target face color, for example, a pure red with a low lightness (L*). The skilled artisan can develop a dual cavity color shifting pigment and plot its process path on a dual cavity CIE L*a*b* chromaticity diagram. A skilled artisan can also develop a single cavity color shifting pigment and plots its process path on a single cavity CIE L*a*b* chromaticity diagram. A skilled artisan can pick a process path location for a composition that has a similar or the same lightness (L*) for each of the dual cavity color shifting pigment and the single cavity color shifting pigment to obtain the target face color. The skilled artisan can then blend varying amounts of the dual cavity color shifting pigment and the single cavity color shifting pigments to match a specific a\*b\* target. For example, if the skilled artisan requires high color performance then the composition can include a major amount of the dual cavity color shifting pigment and a minor amount of the single cavity color shifting pigment. If the skilled artisan requires a new face color not obtainable by either pigment alone, then the composition can include varying amounts of the dual cavity color shifting pigment and a minor amount of the single cavity color shifting pigment. The single and dual cavity chromaticity diagrams show that many color areas, combinations of L\*a\*b\* cannot be reached with a single cavity color shifting pigment or a dual cavity color shifting pigment design alone. The use of a blend of the two disclosed color shifting pigments opens up several areas that cannot be reached with either single cavity color shifting pigment or dual cavity color shifting pigment by itself.

Example 1

The Figures show calculated optical properties, wherein the interval markings, on the curves that define the process path relative to dielectric physical thickness, represent 5 nm physical thickness intervals of a theoretical magnesium fluoride dielectric layer with a refractive index of 1.38 across the visible spectrum, an aluminum reflector layer, and a chromium absorber layer.

To create the most chromatic red, a dielectric layer cannot be thicker than 215 nm, based upon using magnesium fluoride as the dielectric material, without a sharp reduction in chroma, which occurs at approximately 40 degrees hue angle. A desired face color was a red with a hue angle close to 30 degrees without any decrease in chroma or color stability.

Figure 2:
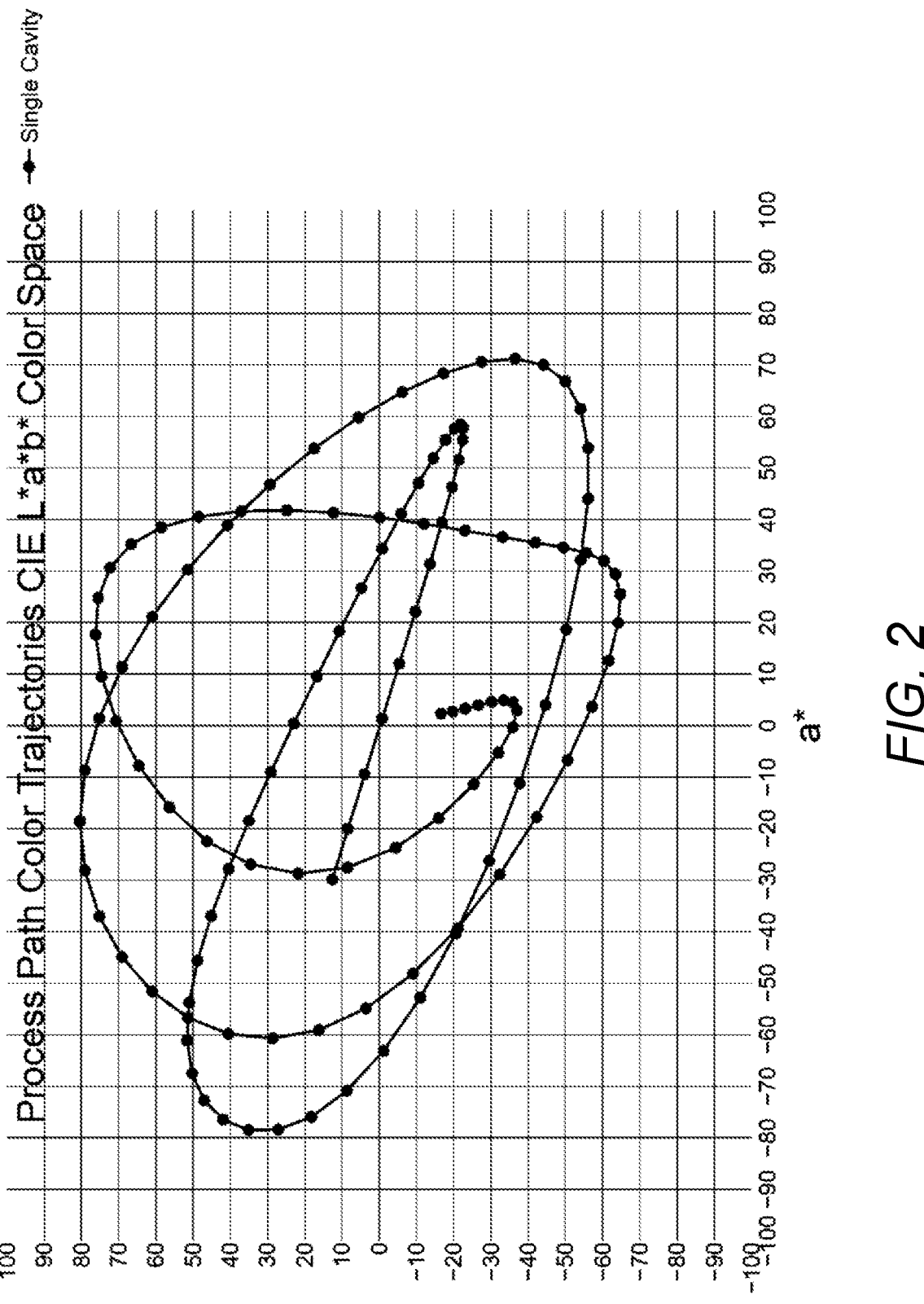
FIG. 2 is a two-dimensional (2D) version of FIG. 1.

A single cavity color shifting pigment included in the composition included: Absorber-Chromium (6.0 nm)/Dielectric-magnesium fluoride (440 nm)/Reflector-Aluminum (40 nm)/Magnetic-stainless steel (26 nm)/Reflector-Aluminum (40 nm)/Dielectric-magnesium fluoride (440 nm)/Absorber-Chromium (6.0 nm). This exemplary single cavity color shifting pigment shifted from magenta to green, as shown in the process paths of FIGS. 1 and 2.

Figure 3:
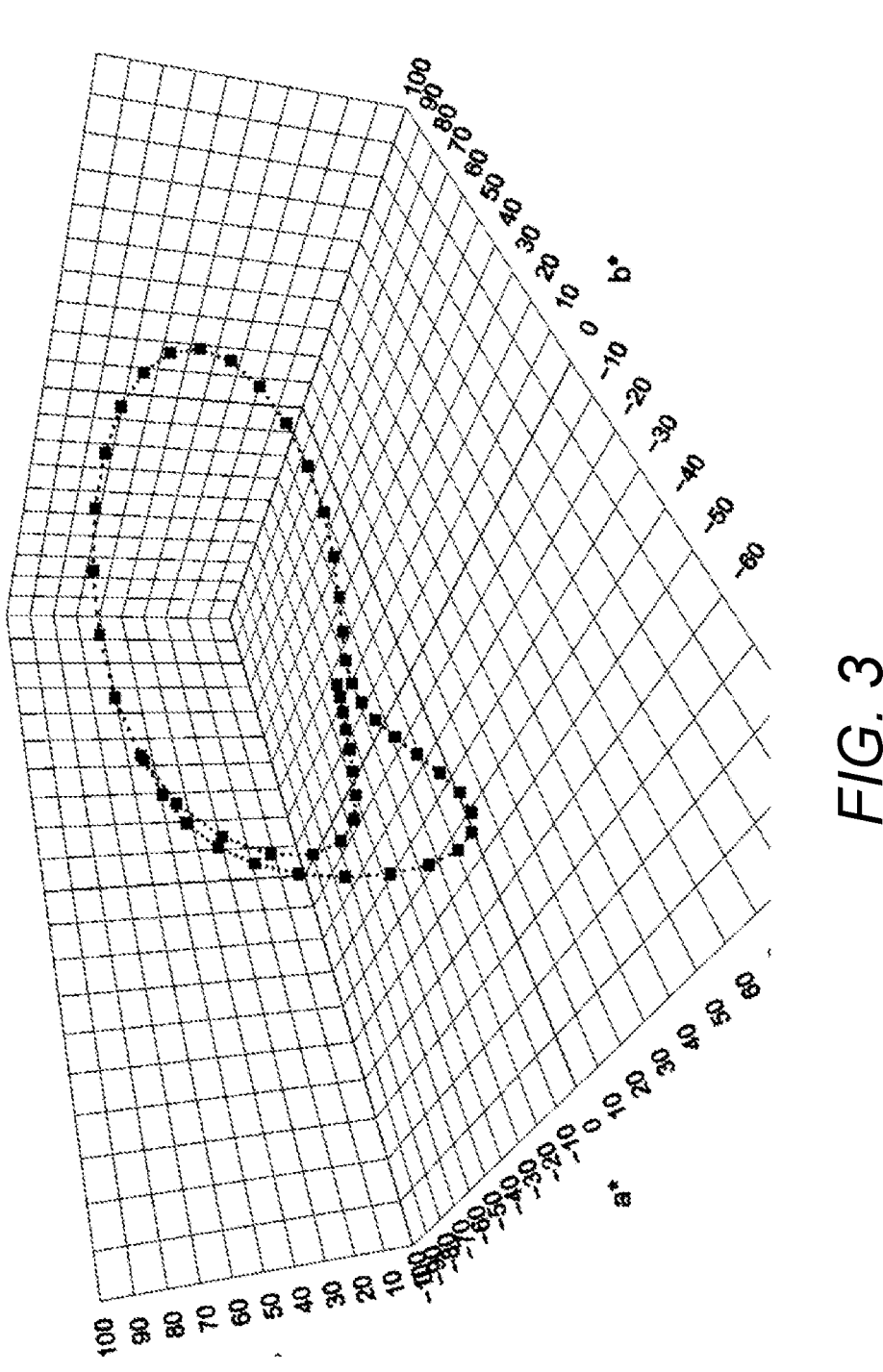
FIG. 3 is an L*a*b* graph illustrating the process path of a dual cavity color shifting pigment in 3D.
Figure 4:
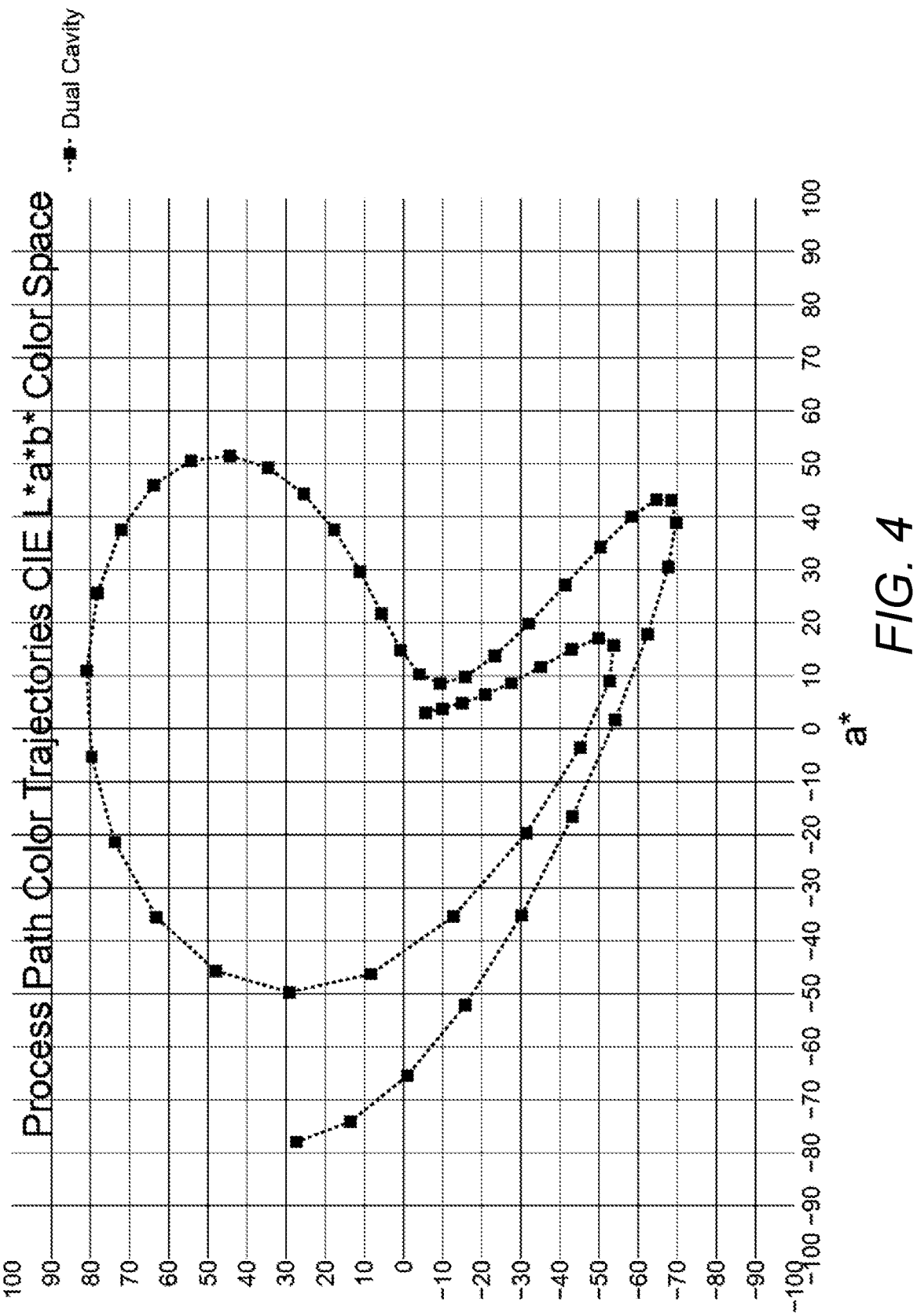
FIG. 4 is a 2D version of FIG. 3.
Figure 5:
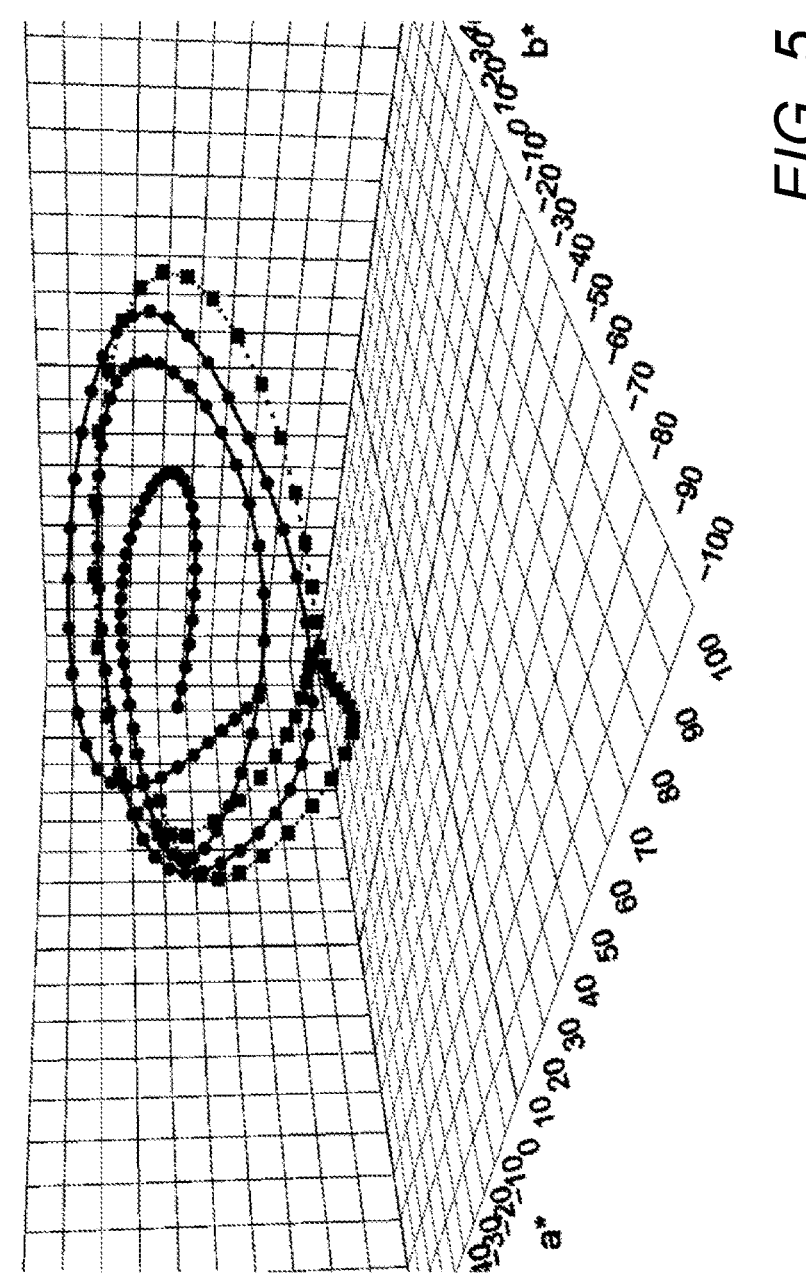
FIG. 5 is an L*a*b* graph illustrating the overlaid process paths of each of the single cavity color shifting pigment of FIG. 1 and the dual cavity color shifting pigment of FIG. 3 in 3D.

The dual cavity color shifting pigment (vermillion color) included: Absorber-Chromium (3.7 nm)/Dielectric-magnesium fluoride (220 nm)/Absorber-Chromium (8.3 nm)/Dielectric-magnesium fluoride (220 nm)/Reflector-Aluminum (40 nm)/Magnetic-stainless steel (26 nm)/Reflector-Aluminum (40 nm)/Dielectric-magnesium fluoride (220 nm)/Absorber-Chromium (8.3 nm)/Dielectric-magnesium fluoride (220 nm)/Absorber-Chromium (3.7 nm). This exemplary dual cavity color shifting pigment color shifted from vermillion (red) face color to gold at angle, with as face color as shown in the process paths of FIGS. 3 and 4.

Figure 6:
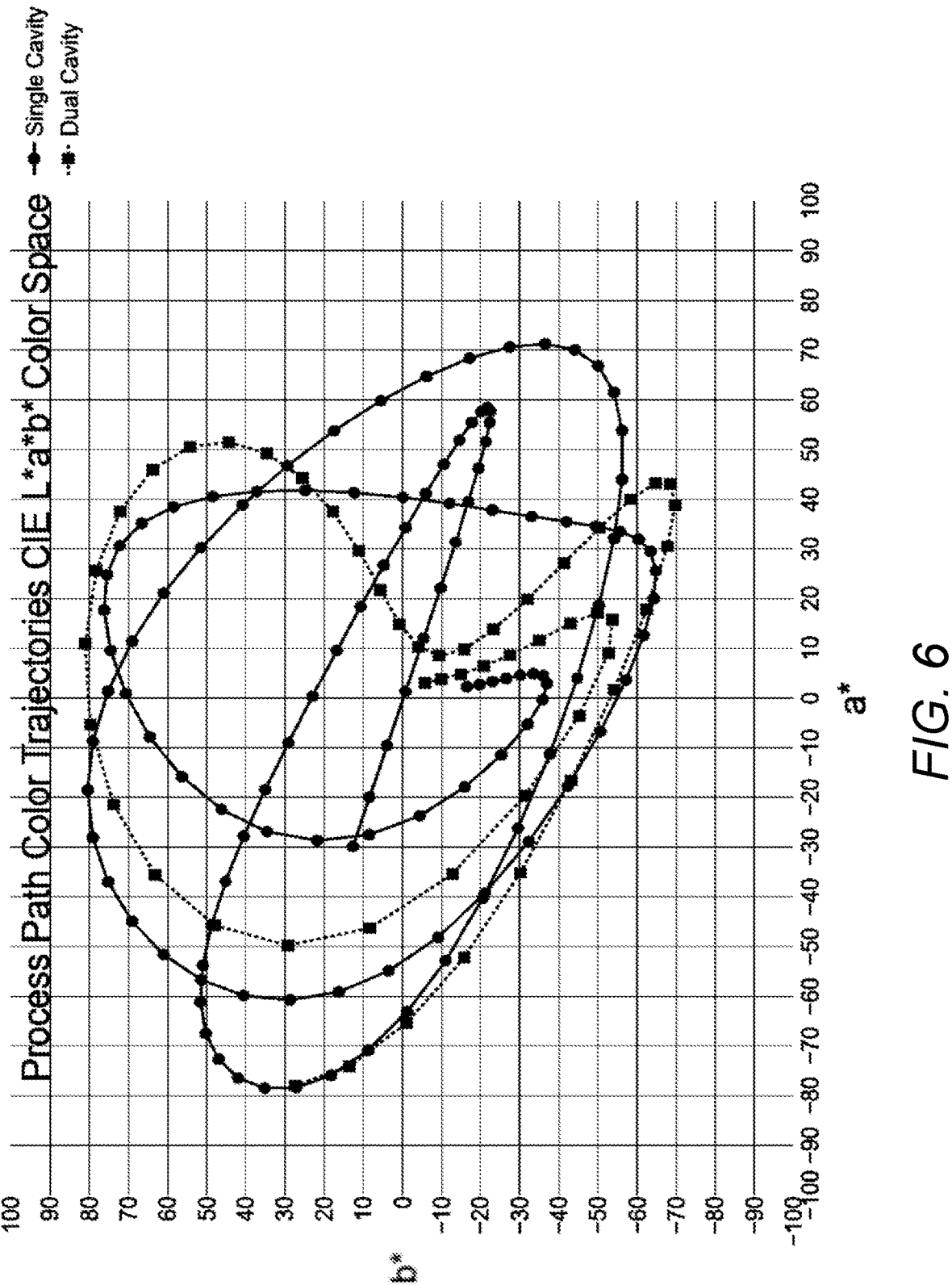
FIG. 6 is a 2D version of FIG. 5.
Figure 7:
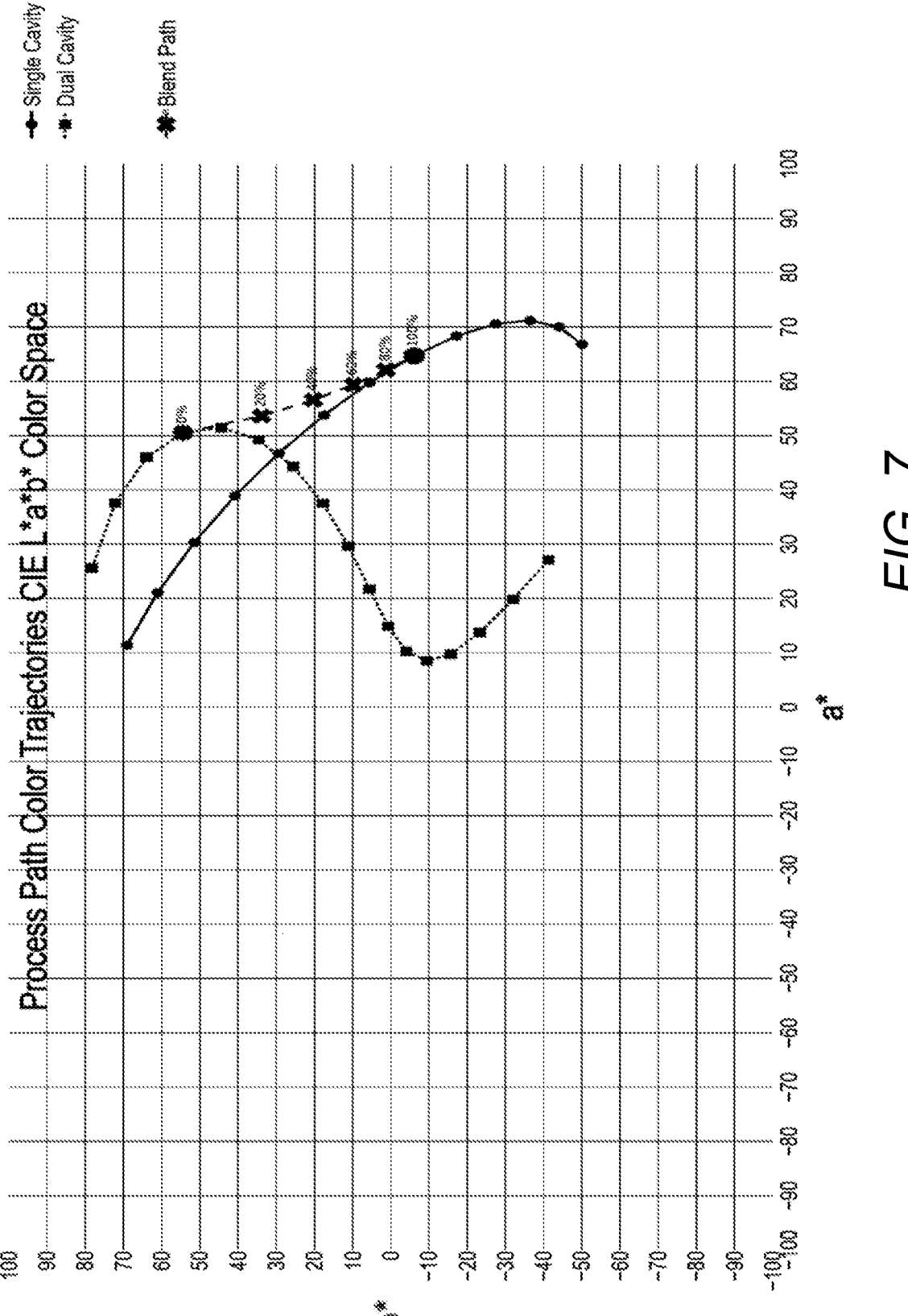
FIG. 7 is a cropped section of FIG. 6 illustrating the red to gold blend path (in 2D) for the composition according to an aspect of the invention.
Figure 8:
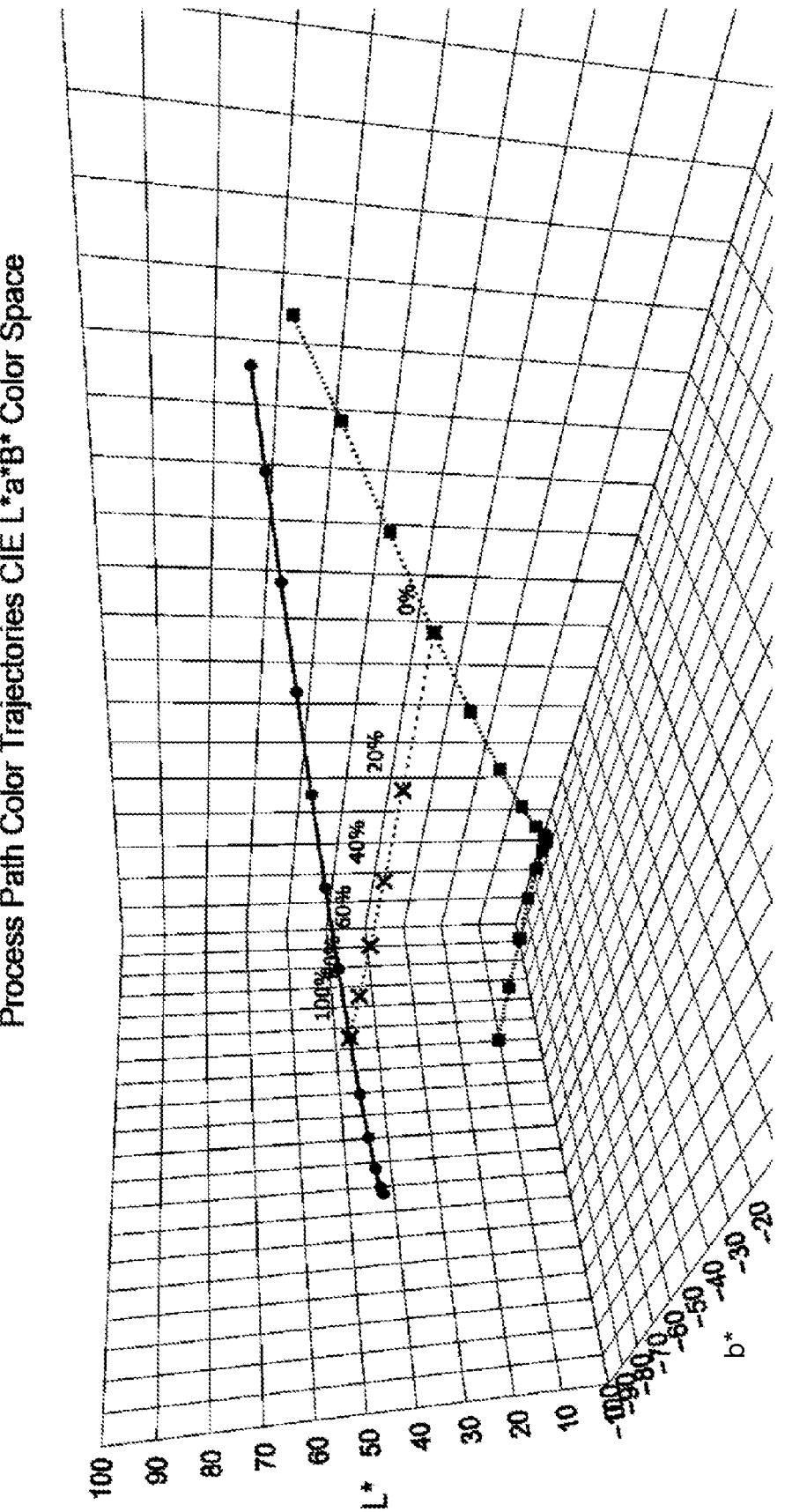
FIG. 8 a 3D version of FIG. 7.

A composition was made with the dual cavity color shifting pigment and a single cavity color shifting pigment. In one specific location, the a\* and b\* values for both disclosed color shifting pigments are identical, as shown in FIGS. 6 and 7. The L\* is different, as shown in FIG. 8, and the higher L\* out of the red spectrum of the single cavity pigment make it a "dirty" red. The dual cavity color shifting pigment has a pure red color but is rather dark, with a low L\*. The blend of a dual cavity color shifting pigment and a single cavity color shifting pigment can enable the option to tune the color to what is perceived as attractive. In order to gain more lightness in this case, the dual cavity color shifting pigment was made with a hue angle more towards orange and the single cavity color shifting pigment color was chosen with a color more towards magenta. A well-chosen composition of the two disclosed pigments can result in a color that is perceived as a more attractive red color. Note that blending to this specific red color relies on the specific spectral response of the human eye. Orange light blended with a small amount of blue is perceived as red, provided the blue energy level is low enough to not make it be a magenta hue. A person trained in the art has the skill to tune the reflected spectrum of the composition to a response that approaches the desired perceived color as a compromise. A pure red color is a specifically difficult color to achieve with interference technology. Ideally it requires high reflection level at the long wavelength portion of the visible spectrum, with a steep fall off to no reflection anywhere else in the visible spectrum. This ideal situation cannot be achieved with either single cavity color shifting pigments or dual cavity color shifting pigments alone, the composition of dual cavity color shifting pigments and single cavity color shifting pigments provides an additional means to get somewhat closer to what is perceived as a pure red color.

The weight amount of each pigment within the composition was varied, i.e., 0%, 20%, 40%, 60%, 80%, and 100% with the total weight of the composition equaling 100%, as shown in FIGS. 7 and 8. So, for example, the composition included 100% of the single cavity pigment and 0% of the dual cavity pigment (bottom right "X" labeled "100%"). In another example, the composition included 80% of the single cavity pigment and 20% of the dual cavity pigment. In another example, the composition included 60% of the single cavity pigment and 40% of the dual cavity pigment. In another example, the composition included 40% of the single cavity pigment and 60% of the dual cavity pigment ("X" labeled "40%"). In another example, the composition included 20% of the single cavity pigment and 80% of the dual cavity pigment. In another example, the composition included 0% of the single cavity pigment and 100% of the dual cavity pigment (upper "X" labeled "0%").

The composition exhibited a more chromatic face color that cannot be achieved by either the dual cavity color shifting pigment or the single cavity color shifting pigment alone.

Example 2

Figure 9:
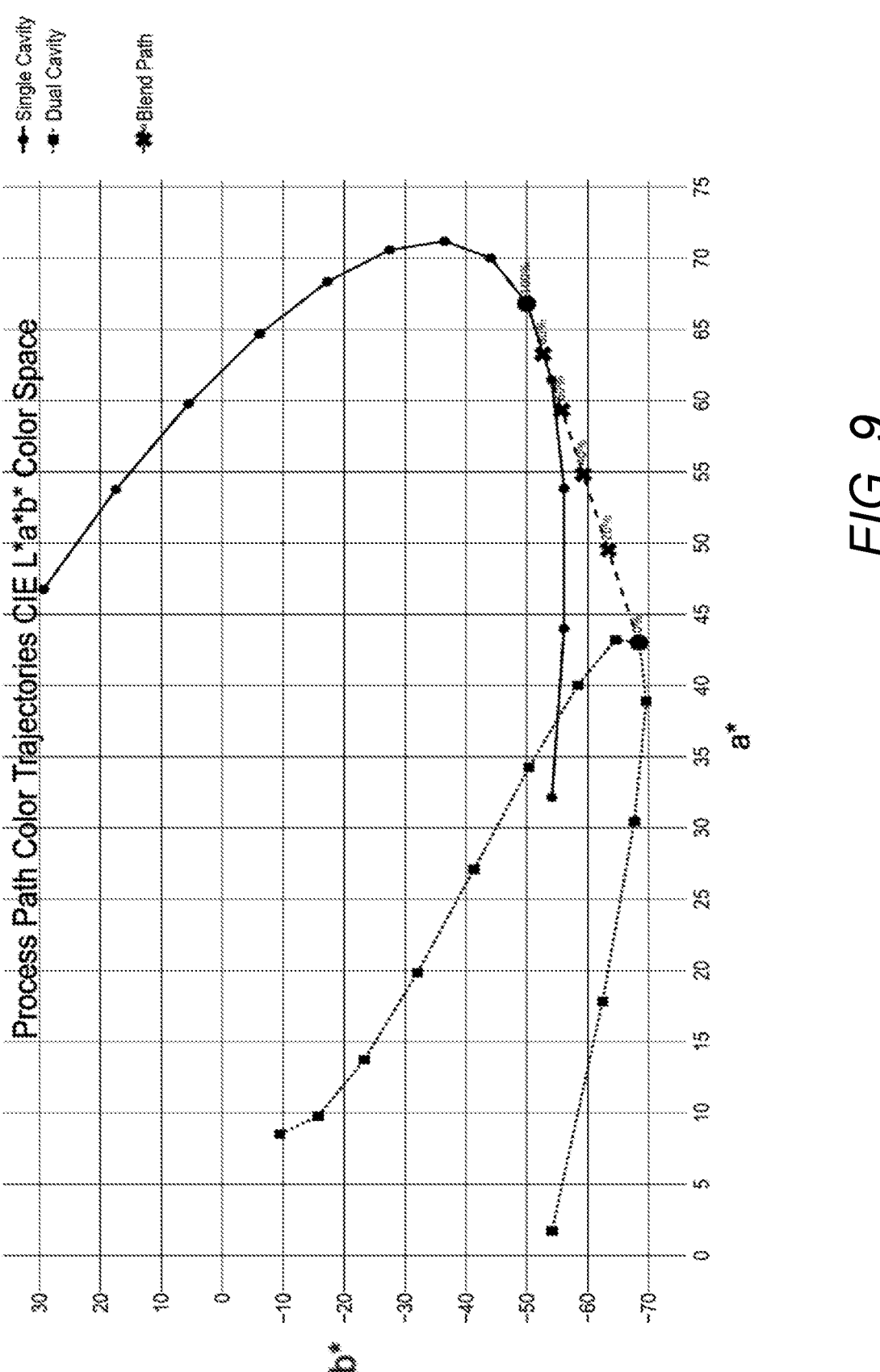
FIG. 9 is an L*a*b* graph (in 2D) illustrating the overlaid process paths of each of a single cavity color shifting pigment, a dual cavity color shifting pigment, and a violet to bronze blend path for a composition according to another aspect of the invention.

The compositions discussed above were also made to obtain a blue face color. The same single cavity color shifting pigment and the same dual cavity color shifting pigment were used in the same various blend compositions, but with a focus on the violet to bronze color shift at the other end of the wavelength spectrum. FIG. 9 illustrates the overlaid process paths for the single cavity color shifting pigment, the dual cavity color shifting pigment, and the blend path. The composition exhibited a face color that cannot be achieved by either the dual cavity color shifting pigment or the single cavity color shifting pigment alone.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

This scope disclosure is to be broadly construed. It is intended that this disclosure disclose equivalents, means, systems and methods to achieve the devices, activities and mechanical actions disclosed herein. For each composition, pigment, method, mean, mechanical element or mechanism disclosed, it is intended that this disclosure also encompass in its disclosure and teaches equivalents, means, systems and methods for practicing the many aspects, mechanisms and compositions disclosed herein. Additionally, this disclosure regards a composition and its many aspects, features and elements. Such a composition can be dynamic in its use and operation, this disclosure is intended to encompass the equivalents, means, systems and methods of the use of the composition and/or pigment of manufacture and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. A composition comprising a dual cavity color shifting pigment; and a single cavity color shifting pigment blended with the dual cavity color shifting pigment;
   wherein the dual cavity color shifting pigment includes a first core having a first side and a second side, a first dielectric layer, a first absorber layer, and a second dielectric layer, the first absorber layer being between the first dielectric layer and the second dielectric layer, the first dielectric layer, the first absorber layer and the second dielectric layer being only on the first side of the core;
   wherein the single cavity color shifting pigment or the dual cavity color shifting pigment includes a high refractive index material as an external layer, and further wherein the external layer is not an absorber layer;
   wherein the single cavity color shifting pigment includes a second core having a first side and a second side and a third dielectric layer only on the first side of the second core; and
   wherein the first core includes a first magnetic layer and the second core includes a second magnetic layer.

2. The composition of claim 1, wherein the core of the dual cavity color shifting pigment includes a reflector layer and the first magnetic layer.

3. The composition of claim 1, wherein the single cavity color shifting pigment further includes an absorber layer.

4. The composition of claim 1, wherein the single cavity color shifting pigment has a structure chosen from any of the following structures:
   the third dielectric/the second core/a fourth dielectric;
   an absorber/the third dielectric/the second core/a fourth dielectric; or
   an absorber/the third dielectric/the second core/a fourth dielectric/a second absorber, wherein the single cavity color shifting pigment is asymmetric.

5. The composition of claim 1, wherein the single cavity color shifting pigment is asymmetric.

6. The composition of claim 1, wherein the dual cavity color shifting pigment has a structure chosen from any of the following structures:
   the second dielectric/the first absorber/the first dielectric/ the first core/a fifth dielectric;
   a second absorber/the second dielectric/the first absorber/ the first dielectric/the first core/a fifth dielectric;

the second dielectric/the first absorber/the first dielectric/ the first core/a fifth dielectric/a third absorber;
   a second absorber/the second dielectric/the first absorber/ the first dielectric/the first core/a fifth dielectric/a third absorber;
   the second dielectric/the first absorber/the first dielectric/ the first core/a fifth dielectric/a third absorber/a sixth dielectric;
   a second absorber/the second dielectric/the first absorber/ the first dielectric/the first core/a fifth dielectric/a third absorber/a sixth dielectric; or
   a second absorber/the second dielectric/the first absorber/ the first dielectric/the first core/a fifth dielectric/a third absorber/a sixth dielectric/a fourth absorber;
   wherein the dual cavity color shifting pigment is asymmetric.

7. The composition of claim 1, wherein the dual cavity color shifting pigment is present in the composition in a major amount.

8. The composition of claim 1, wherein the dual cavity color shifting pigment is present in the composition in an amount ranging from about 50% to about 99% by weight based upon the total weight of the composition.

9. The composition of claim 1, wherein the single cavity color shifting pigment is present in the composition in a minor amount.

10. The composition of claim 1, wherein the single cavity color shifting pigment is present in the composition in an amount ranging from about 1% to about 49% by weight based upon the total weight of the composition.

11. The composition of claim 1, wherein the dual cavity color shifting pigment has a structure chosen from any of the following structures:
   the second dielectric/the first absorber/the first dielectric/ the first core/a fifth dielectric;
   a second absorber/the second dielectric/the first absorber/ the first dielectric/the first core/a fifth dielectric;
   the second dielectric/the first absorber/the first dielectric/ the first core/a fifth dielectric/a third absorber;
   the second dielectric/the first absorber/the first dielectric/ the first core/a fifth dielectric/a third absorber/a sixth dielectric;
   a second absorber/the second dielectric/the first absorber/ the first dielectric/the first core/a fifth dielectric/a third absorber/a sixth dielectric
   wherein the dual cavity color shifting pigment is asymmetric.

12. A composition comprising a dual cavity color shifting pigment; and a single cavity color shifting pigment;
   wherein the dual cavity color shifting pigment includes a core having a first side and a second side, a first dielectric layer, a first absorber layer, a second dielectric layer and a second absorber layer, the first absorber layer being between the first dielectric layer and the second dielectric layer, the first dielectric layer, the first absorber, the second dielectric layer and the second absorber layer being only on the first side of the core;
   wherein the single cavity color shifting pigment includes a second core having a first side and a second side, a third dielectric layer and a third absorber layer, the third dielectric layer and the third absorber layer being only on the first side of the second core; and
   wherein the composition results in a red face color, the dual cavity color shifting pigment having a hue angle more towards orange relative to the red face color and the single cavity color shifting pigment having a hue angle more towards magenta relative to the red face color, as measured in L*a*b* color space.

13. A composition comprising a dual cavity color shifting pigment; and a single cavity color shifting pigment;

wherein the dual cavity color shifting pigment includes the following structure: a Chromium absorber having a thickness of 3.7 nm/a magnesium fluoride dielectric having a thickness of 220 nm/a Chromium absorber having a thickness of 8.3 nm/a magnesium fluoride dielectric having a thickness of 220 nm/an aluminum reflector layer/a magnetic layer/an aluminum reflector layer/a magnesium fluoride dielectric having a thickness of 220 nm/a Chromium absorber having a thickness of 8.3 nm/Dielectric-magnesium fluoride (220 nm)/a Chromium absorber having a thickness of 3.7 nm; and wherein the single cavity color shifting pigment includes the following structure: a Chromium absorber having a thickness of 6.0 nm/a magnesium fluoride dielectric having a thickness of 440 nm/an aluminum reflector layer/a magnetic layer/an aluminum reflector layer/a magnesium fluoride dielectric having a thickness of 440 nm/a Chromium absorber having a thickness of 6.0 nm.

* * * * *